May 8, 1951  G. L. KOHR ET AL  2,551,609
RADIO DRIFT BOMB
Filed July 28, 1942  2 Sheets-Sheet 1
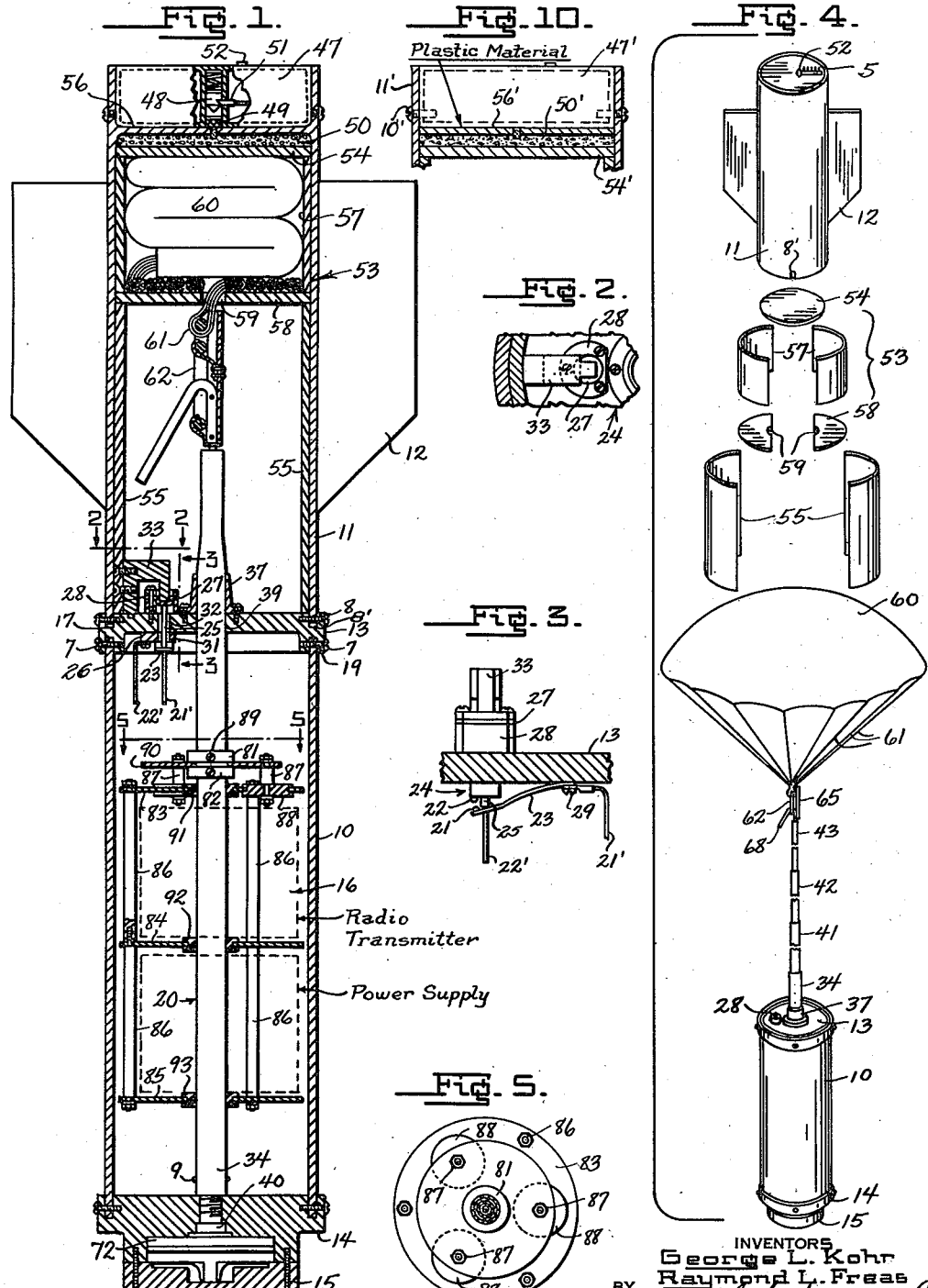
INVENTORS
George L. Kohr
Raymond L. Freas
BY
ATTORNEY May 8, 1951 G. L. KOHR ET AL 2,551,609
RADIO DRIFT BOMB
Filed July 28, 1942 2 Sheets-Sheet 2
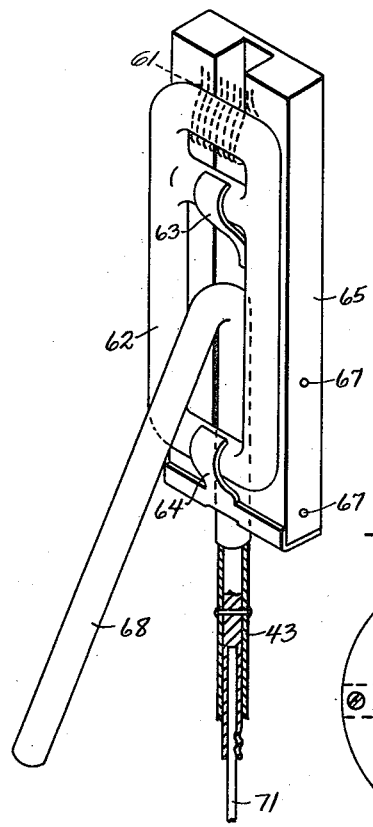
Fig. 6.
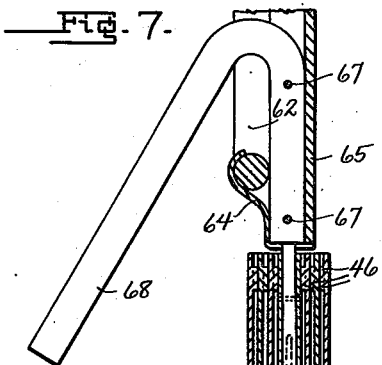
Fig. 7.
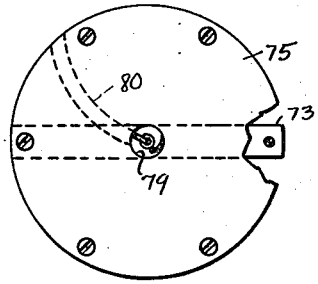
Fig. 8.
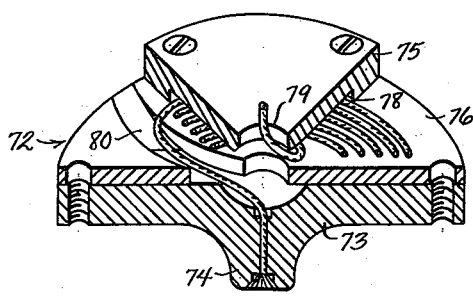
Fig. 9.
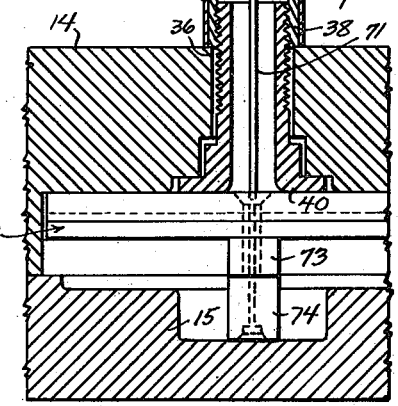
INVENTORS
George L. Kohr
Raymond L. Freas
BY
ATTORNEY Patented May 8, 1951

2,551,609

UNITED STATES PATENT OFFICE 2,551,609

RADIO DRIFT BOMB

George L. Kohr, United States Navy, and Raymond L. Freas, Conshohocken, Pa.

Application July 28, 1942, Serial No. 452,616

12 Claims. (Cl. 250—1)

(Granted under the act of March 3, 1883, as amended April 30, 1928; 370 O. G. 757)

This invention relates to a radio transmitting apparatus for quickly and accurately determining the "drift factor" in aerial navigation, and more particularly to an apparatus which may be dropped or launched from an aircraft to a water or land surface and which automatically radiates radio frequency signals while resting on the aforementioned water or land surface.

The visual means for obtaining the drift of an aircraft which have been utilized heretofore are subject to many errors, and are useless when visual contact with the ground or sea cannot be maintained, because of weather conditions for instance. This latter disadvantage condemns reliance upon the visual method of obtaining drift sights during war, since it may be hazardous to attempt to maintain visual contact with the ground or sea. Notwithstanding these disadvantages it remains highly desirable to have a method available by means of which the "drift factor" may be obtained, since it is a comparatively simple matter to successfully navigate an aircraft if the drift factor, and hence the force and direction of the wind, can be obtained at all times during the flight of an aircraft. Consequently, a new field for obtaining these "drift sights" has been investigated and the particular field selected is radio frequency energy.

It is noted from the patented literature available on this subject that the method which we utilize in obtaining "drift sights" has been proposed heretofore in the U. S. Patent No. 1,780,369, to C. A. Snow, Jr.

It is an object of this invention to provide an apparatus which offers several important improvements over the device illustrated in the aforementioned U. S. patent.

In obtaining drift sights by the use of radio signals it is imperative that suitable means be provided for controlling the rate of descent of the radio transmitting apparatus. It is an object of this invention, therefore, to provide a delayed opening parachute which allows the apparatus hereinafter termed the "radio drift bomb" to fall freely for a predetermined distance, dependent upon the altitude from which the bomb is dropped, before the parachute is released to retard the rate of fall and prevent hard landings.

It is also an object of this invention to provide an apparatus, which, when dropped from an aircraft to a water or land surface, automatically radiates radio frequency signals while resting on either of the said surfaces with means for automatically erecting an antenna for the said radio transmitting apparatus.

It is a further object of this invention to provide a radio drift bomb with means for automatically energizing the radio transmitting apparatus contained therein after said bomb has fallen freely a predetermined distance.

With the foregoing and other objects in view, the invention consists in the construction, combination and arrangement of parts hereinafter described and illustrated in the drawings, in which:

Fig. 1 is a longitudinal sectional view of said radio drift bomb;

Fig. 2 is a fragmentary cross-sectional view taken on line 2—2 of Fig. 1;

Fig. 3 is a schematic cross-sectional view taken on line 3—3 of Fig. 1;

Fig. 4 is a diagrammatic view illustrating the operation of said device;

Fig. 5 is a plan view taken on line 5—5 of Fig. 1;

Fig. 6 is a detailed perspective view of the parachute releasing mechanism;

Fig. 7 is an enlarged cross-sectional view of the antenna structure with attachments therefor disclosed in Fig. 1;

Fig. 8 is a plan view with a portion broken away of the reel shown in Fig. 1;

Fig. 9 is a perspective view of the reel shown in Fig. 1;

Fig. 10 is a partial view in cross section of a modification of Fig. 1.

We wish to refer now to the drawings and particularly to Fig. 1 which shows the general organization of the radio drift bomb as including a cylindrical casing 10 which forms a housing enclosing the radio transmitting apparatus and the power supply source therefor. One end of the casing 10 is secured to an intermediate disklike bulkhead 13 by having its cylinder edge inserted into a complementary peripheral groove 19 formed in the under surface of the bulkhead 13. The screws 7 are threaded through aligned openings formed in the bulkhead 13 and the cylinder casing 10 to retain the edge of this cylindrical casing tightly against a suitable gasket lying in the bottom of the groove 19 so as to form a water-tight enclosure at the junction of the bulkhead 13 and the casing 10. A second cylindrical casing 11 is secured to the bulkhead 13 so as to be easily removable therefrom by having its cylindrical edge inserted into the external circumferential groove 17. The screws 8 extend cross the groove 17 through an open ended slot 8' formed in the casing 11 to clamp the cylindrical edge of the casing 11 between the side surfaces of the circumferential groove 17. The second cylindrical casing 11 has a plurality of guide fins 12 secured to its outer surface for the purpose of causing the two casings to fall together vertically after being released from said aircraft.

A disk 14 and a cap 15 are secured together and are secured also to the open end of the casing 10 to complete the water-tight enclosure which houses the radio transmitting apparatus. Since the details of the raido transmitting apparatus form no part of this invention, such apparatus has not been disclosed. However, in the preferred embodiment of my invention, the chassis of the radio transmitting apparatus is adapted to be secured to the concentric disks 83 and 84 and occupies the space indicated generally on the drawings at 16. The enclosure formed by the casing 10 houses, in addition to the radio transmitting apparatus and the antenna structure 20, a suitable power pack (not shown) for supplying the necessary electrical energy to the radio transmitting apparatus. While the details of the power pack are not disclosed, we prefer to secure the power pack to the concentric disks 84 and 85 so that the power pack will be retained within the space defined by these two concentric disks. The power supply source contained within this space is connected to the radio transmitting apparatus through the terminals 21' and 22' leading to the contacts 21 and 22 of the power supply switch 24. The contact 21 of this power supply switch is secured to a conductive leaf spring 23 which is in turn secured to the bulkhead 13 by means of the contact binding post 29 (Fig. 3). The leaf spring 23 maintains the contact 21 in a biased position of forced engagement with the stationery or fixed contact 22. The stationary or fixed contact 22 is preferably integrally formed with the contact block 26 which is secured to and insulated from the bulkhead 13. An insulated operating rod 25 for the switch 24 extends through a pair of aligned openings 31 and 32 which are formed in the contact block 26 and in the bulkhead 13 respectively. The cup-shaped enclosure 28 is placed over the opening 32 formed in the bulkhead 13 sealing this opening to maintain the watertight integrity of the cylinder casing 10. This cup-shaped housing 28 has a flexible diaphragm 27 forming an end surface thereof which upon the application of a force thereto will cause the insulated operating rod 25 to be moved into engagement with the leaf spring 23 forcing the contact 21 out of its position of conductive engagement with the stationary contact 22. An operating block 33 for the switch 24 is secured to a split casing 55 which is retained within the cylindrical casing 11 so that when the casings 10 and 11 are secured together, the operating block 33 will be forced into engagement with the diaphragm 27 causing the operating rod 25 to move the contact 21 out of its position of conductive engagement with the contact 22 thereby maintaining an open circuit between the power supply source to be retained within the space between the disks 84 and 85 and the radio transmitting apparatus to be mounted within the space defined by the disks 83 and 84.

The flexible telescopic antenna 20 is positioned centrally within the casing 10 and comprises specifically an outer metallic tube 34 which is secured to a tap threaded collar 38 by means of the through pin 9, collar 38 being threaded on to the projecting end of the hollow bushing 40 which is positioned centrally within the cavity 36 formed in the disk 14. This exterior tube of the antenna projects outwardly through the opening 39 of the bulkhead 13 and is sealed to this bulkhead so as to form a water-tight connection therewith by means of the sleeve 37. The inner tubular members 41, 42 and 43 (Fig. 7) each have a collar 45 secured to their lower ends which serve to hold these tubular members in an assembled position with their outer surfaces radially separated from each other by the thickness of these collars. Upon extending the antenna 20 these collars 45 are jammed firmly into engagement with the inner surface of the next exteriorly adjacent tubular member at a swaged portion formed at the upper end thereof. A plurality of collars 46 are also secured to the inner surface of the tubular members at their upper swaged portions for the purpose of keeping the various sections of the antenna in alignment when the antenna is being extended.

The second casing 11 has a suitable time fuse indicated generally at 47 located in an end thereof. While the specific details of this time fuse are not shown in the present illustrated disclosure of this invention for the reason that such fuses are well known to the art, we have indicated the fuse in Fig. 1 as comprising a spring influenced firing pin 48 which may be released into precussive engagement with the detonating cap 49 leading to the powder charge 50 by the engaging pawl 51. This pawl 51 is operated by a suitable timing mechanism which may be adjusted for variations in the particular altitude from which the bomb is to be dropped by setting the indicator 52 in a position along the graduated scale 5, shown in Fig. 4, corresponding to the said altitude. Slidably fitted into the casing 11 is a multipart container 53 which has an end 54 shown spaced slightly from the bulkhead 56 of the chamber containing the time fuse 47 so as to define a space into which the powder propelling charge 50 is placed. The remaining portions of the inner multipart container are particularly well disclosed in Fig. 4 and consist specifically of a split cylinder 57 and a split diaphragm 58 which forms an enclosure into which parachute 60 is housed. The split diaphragm 58 has its opening 59 formed therein through which the shrouds 61 of the parachute 60 extend to engage the shroud ring 62. When the propelling powder charge 50 is ignited by the fuse 47, the pressure set up therein by the expanding gases is transmitted to the diaphragm 54 and to the bulkhead 56. The split casing members 55 prevent movement of the diaphragm 54 consequently the second casing 11 will be propelled upwardly out of engagement with the intermediate bulkhead 13. The shroud ring 62, as illustrated in Fig. 6, is clamped by means of spring clips 63 and 64 to the channel member 65. The channel member 65 is securely fastened to the V-shaped hook 68 by means of the through pins 67. The V-shaped hook is secured to the inner tubular antenna member 43. These spring clips 63 and 64 permit the shroud ring 62 to be pulled free of the channel member 65 by the parachute shrouds 61 when the parachute is initially opened. A cable 71 is provided which connects the hook 68 with the bottom disk 14 of the enclosing casing 10 so that after the antenna has been fully extended, the stress which is developed within the antenna structure by the sudden deceleration of the radio drift bomb during the initial opening of the parachute will be relieved and transmitted through this cable 71 to the bottom of the radio drift bomb assembly. This cable or wire 71 is also used to position the support below the center of gravity of the radio drift bomb.

In order that this cable which is connected between the hook 68 and the bottom disk 14 may be "played out" as the antenna is being extended without being twisted or kinked, a container for the cable is provided in the form of a rotatable reel 72. This reel is clearly shown in Figs. 8 and 9 and consists specifically of an anchoring bar 73 to which the cable 71 is securely fastened. This anchoring bar 73 has a projection 74 which forms a bearing surface with the cap member 15 to facilitate rotation of the reel assembly 72. The cable is coiled and contained between the upper and lower disks 75 and 76 in a space defined by the center recess 78 cut out of the under surface of the disk 75. One end of the cable is led out through an opening 79 formed in the disk 75 and extends upwardly through the interior of the inner tubular antenna member 42 to engage the hook 68 as is clearly shown in Fig. 6. The other end of the cable extends through the curved slot 80 cut in the under surface of the disk and is anchored to the bar 73 as illustrated in Fig. 9. Upon withdrawal of the cable 71 from the space 78 formed between the inner disk 76 and the upper disk 75, the entire reel which consists of these two disks and the anchoring bar 73 is free to rotate about a vertical axis in the space defined between the cap 15 and the bottom disk 14. The flange bushing 40 facilitates rotation of the reel 72. The rotation of these reels automatically prevents the formation of any twist within the cable or wire 71 which would otherwise result if the reel 72 were not free to rotate.

Referring again to Fig. 1 wherein the details of the support for the radio transmitting apparatus and the power pack are disclosed, the disk 90 is rigidly attached by means of the collars 81 and 82 to the exterior tube 34 of the flexible telescopic antenna 20. The position of the disk 90 may be adjusted axially along the supporting antenna 20 by means of the set screws 89. The support structure for the chassis of the radio transmitting apparatus consists specifically of the three concentric disks 83, 84 and 85 each of which are supported so as to be free to slide vertically along the supporting antenna tube 34. Rubber eyelets 91, 92 and 93 are provided between the concentric disks 83, 84 and 85 respectively and the antenna tube 34 for the purpose of absorbing shock and vibrations. The disks are maintained in the illustrated position axially spaced along the antenna supporting structure 34 by means of three equally spaced supporting rods 86. Rigidly attached to the disk 90 are a plurality of axially extending rods 87. These rods are secured to the disk 83 by means of the rubber grommets 88 which are set into the disk 83. These grommets permit movement of the chassis of the radio apparatus axially along the antenna tube 34 relative to the disk 90 and prevent the shocks of landing from being transmitted directly to the radio transmitting apparatus (not shown) which is supported on these disks. The disk 85 is also secured to the disk 84 and spaced axially therefrom by means of the spacing rods 86 so as to provide a support for the power pack which comprises the source of energy for the radio transmitting apparatus.

The operation of the radio drift bomb is as follows:

From a known altitude the operator sets the indicator 52 of the time fuse 47 so that the firing pin 48 will be released to percussively engage the firing cap 49 and thereby ignite the propelling powder charge 50 when the radio drift bomb has descended to within a predetermined distance of the earth's surface. The bomb is then dropped overboard and permitted to fall freely through the atmosphere. While falling freely through the atmosphere the radio transmitting apparatus is not energized since the contacts 21 and 22 of the radio transmitting apparatus power supply switch 24 are maintained in a position out of conductive engagement by the operating block 33 and the operating rod 25. As soon as the bomb has descended to within the predetermined distance of the earth's surface, the propelling powder charge 50 will be ignited by the time fuse 47 and the casing 11 will be propelled rearwardly free of the casing 10 by the force of the expanding gases liberated upon combustion of the powder charge 50. By virtue of the fact that the interior multipart container is without its supporting structure, this interior container will be free to fall apart and away from the casing 10 thus allowing the parachute 60 to be released. Upon release of this parachute, the shroud ring 62 is pulled free of the spring clips 63 and 64 into engagement with the hook 68. The deceleration forces caused by the opening of the parachute will be transmitted through the hook 68 to the interior tubular antenna 43 causing this inner antenna to be extended upwardly until it engages the swaged portion formed at the free end of the next outer antenna 42. The force pulling the inner tubular antenna member upwardly would be thus transmitted to the next external adjacent tubular antenna 42 to extend this portion of the antenna structure. The remaining movable sections are then extended in order.

The cable or wire 71 is provided for the purpose of relieving the antenna structure of the stresses developed therein due to the sudden deceleration of the radio drift bomb after the parachute has opened and after the antenna has been fully extended. Before the parachute is opened and before the telescopic antenna 20 has been extended, the cable 71 is coiled within the space 78 of the reel assembly 72 and has an end secured to the anchoring bar 73 thereof. As the antenna sections are extended, the cable 71 fastened to the upper end of the inner antenna section is "played out" and run up on the inside of the antenna and thus removed from the reel assembly 72. This reel rotates freely about its vertical axis preventing the formation of any twist within the cable or wire when the cable is completely unreeled and the force transmitted by the parachute to the flexible antenna structure will be taken up in the cable 71 and transmitted to the anchoring bar 73 which is located in the nose of the radio drift bomb.

Substantially simultaneously with the release of the parachute 60, the radio transmitting apparatus is energized from the power pack through the power supply switch 24. This action results from the fact that the operating block 33 is secured to one section of the inner casing 55 and holds the operating rod 25 into engagement with the flexible leaf spring 23 thus separating the contacts 21 and 22. When the parachute is released, the slit casing 55 falls free of the radio drift bomb and frees the operating rod 25 allowing the contacts 21 and 22 to move into engagement thereby completing the circuit connecting the supply source to the radio transmitting apparatus.

After the radio drift bomb has alighted upon the water or land surface, the pull of the parachute upon the shroud ring 62 is released and the ring falls free by gravity over the open end of the hook 68 thus releasing the parachute from the buoyant casing 10. The channel member 65 which is secured to the inner end of the antenna structure 43 constrains the shroud ring 62 so that it can fall only in one direction, that direction being over the open end of the hook. In this manner the parachute will be released from its engagement with the antenna structure immediately after the pull of the parachute upon the radio drift bomb has been released.

In Fig. 10 we have shown one end of a modified casing structure. In this modification the timer 47' is securely fastened to the casing 11' by means of the screws 10' which extend inwardly of the casing 11'. The bulkhead member 56' is not formed integrally with the casing as in the manner illustrated in Fig. 1 but is entirely separate therefrom. The casing 11' is preferably formed of cardboard or some similar material which is not as strong as the bulkhead 56' which could be formed of a phenolic condensation product such as "Bakelite" or other synthetic resinous material. The cardboard casing 11' could then be secured to the bulkhead 13 by having the screws 8 pass through aligned openings formed therein rather than use the open slots 8'. When the charge 59' explodes the casing 11' will be separated from the bulkhead 13 by tearing out the casing walls where the screws 8 pass through it.

In accordance with the patent statute, we have shown and described the preferred embodiment of this invention with the understanding, however, that we reserve the right to make such changes in the number and arrangement of parts as may be required without departing from the spirit of this invention or the scope of the appended claims.

The invention herein described may be manufactured and used by or for the Government of the United States of America for governmental purposes without the payment of any royalties thereon or therefor.

We claim:

1. In a radio drift bomb adapted to be dropped from an aircraft for the purpose of obtaining the drift angle of said aircraft, the combination of a first casing, a radio transmitting apparatus housed therein, shock absorbing means securing said radio transmitting apparatus to said casing, a telescopical antenna, means securing one end of said antenna to said first casing, a second casing having a parachute housed therein, said parachute being secured to the free end of said telescopical antenna, means for detachably securing said second casing to said first casing so that the said casings will fall together as a unit when dropped from said aircraft, and means automatically forcing said second casing out of securing engagement with said first casing so that said second casing may fall freely of said first casing whereby the parachute will be released, erecting said antenna and retarding the rate of descent of said radio transmitting apparatus.

2. The combination defined in claim 1 characterized further by the addition thereto of cable means for absorbing the tensional stresses developed in said antenna by the sudden deceleration of said radio transmitting apparatus after said antenna has been fully extended.

3. In a radio drift bomb adapted to be dropped from an aircraft for the purpose of obtaining the drift angle of said aircraft, the combination of a first casing having a radio transmitting apparatus and an electrical supply source housed therein, a pair of contacts carried by said casing for connecting said power supply source to said radio transmitting apparatus, one of said contacts being movable from a position of forced engagement with the other contact, a second casing having a parachute housed therein, said parachute being secured to said first casing to control the rate of descent thereof, means effecting a securing engagement between said first and second casings, means causing said movable contact to be forced to a position out of conductive engagement with said fixed contact when said first and second casing are in securing engagement, and means for automatically propelling said second casing out of securing engagement with the first casing after said radio drift bomb has fallen a predetermined distance, whereby the parachute will be released and the radio transmitting apparatus will be energized from said power supply source.

4. In a radio drift bomb adapted to be dropped from an aircraft for the purpose of obtaining the drift angle of said aircraft, the combination of a first casing, an apparatus capable of transmitting radio frequency signals when energized from a suitable electrical power supply source housed within said first casing, a second casing having a parachute housed therein, the shrouds of said parachute being connected to the first casing, means effecting a securing engagement between said casings, means automatically forcing said second casing out of securing engagement with said first casing after said bomb has fallen a predetermined distance to release said parachute, and means governed by the above-named means for controlling the energization of said transmitting apparatus whereby said apparatus will not transmit radio signals until it has fallen the said predetermined distance.

5. In a radio drift bomb adapted to be dropped from an aircraft for the purpose of obtaining the drift angle of said aircraft, the combination of a first casing, a radio transmitting apparatus housed therein, an extendable antenna therefor, a second casing having a parachute housed therein for controlling the rate of descent of said transmitting apparatus, said second casing being detachably secured to said first casing, means for causing said second casing to be disengaged from said first casing so as to fall freely therefrom, releasing said parachute, and means governed by the release of said parachute for extending said antenna.

6. In a radio drift bomb adapted to be dropped from an aircraft for the purpose of obtaining the drift angle of said aircraft, the combination of a first casing, a radio transmitting apparatus housed therein, a second casing open at an end thereof secured to said first casing at its open end, a parachute detachably secured to said first casing for controlling the rate of descent of said first casing, said second casing housing a multi-part container for said parachute, a propelling powder charge positioned between the other end of said second casing and said multi-part container, means for igniting said propelling charge after said radio drift bomb has fallen a predetermined distance, whereby said second casing will be propelled from its securing engagement with said first casing, permitting said parachute container to fall apart, releasing said parachute.

7. The combination defined in claim 5 characterized by the addition thereto of means automatically disengaging said parachute from supporting engagement with said first casing after said casing has been safely landed.

8. In a radio drift bomb adapted to be dropped from an aircraft for the purpose of obtaining the drift angle of said aircraft, the combination of a first casing having a radio transmitting apparatus and an electrical power supply source housed therein; a pair of contacts carried by said casing for connecting said power supply source to said radio transmitting apparatus, one of said contacts being movable from a position of forced engagement with the other fixed contact; a second casing having a parachute housed therein, the shrouds of said parachute being secured to said first casing; means effecting a securing engagement between said first and second casings causing said movable contact to be forced to a position out of conductive engagement with said stationary contact, and means automatically propelling said second casing out of securing engagement with said first casing after the said drift bomb has fallen a predetermined distance, whereby the radio transmitting apparatus will be energized from said supply source and said parachute will be released to retard the rate of descent of said first casing.

9. In a radio drift bomb adapted to be dropped from an aircraft for the purpose of obtaining the drift angle of said aircraft, the combination of a first casing, a radio transmitting apparatus housed therein, a second casing having a parachute housed therein, the shrouds of said parachute being secured to said first casing, said second casing being detachably secured to said first casing, means for automatically disengaging said first casing from said second casing, so as to fall freely therefrom whereby the parachute will be released to retard the rate of fall of said radio transmitting apparatus after the radio bomb has fallen freely a predetermined distance and means operable upon actuation of the last-named means for energizing said transmitting apparatus.

10. In a radio drift bomb adapted to be dropped from an aircraft for the purpose of obtaining the drift angle of said aircraft, the combination of a first casing, a radio transmitting apparatus housed therein, shock absorbing means securing said transmitting apparatus to said casing, a telescopical antenna, means securing one end of said antenna to said first casing, a second casing having a parachute housed therein, the shrouds of said parachute being secured to the free end of said telescopical antenna, means for detachably securing said second casing to said first casing so that the said casings will fall together as a unit when dropped from said aircraft, and means automatically forcing said second casing out of securing engagement with said first casing so that said second casing may fall freely of said first casing, whereby the parachute will be released, erecting said antenna and retarding the rate of descent of said radio transmitting apparatus.

11. The combination defined by claim 10 characterized further by the addition thereto of means for relieving said antenna of the tensional forces set up therein by the deceleration of said radio transmitting apparatus after said antenna has been fully extended.

12. In a radio drift bomb adapted to be dropped from an aircraft for the purpose of obtaining the drift angle of said aircraft, the combination of a first casing adapted to house a radio transmitting apparatus, a telescopical antenna, means securing an end of said antenna to said first casing, a second casing having a parachute housed therein, the shrouds of said parachute being releasably secured to the free end of said antenna, means for detachably securing said second casing to said first casing so that said casings will fall together as a unit when dropped from said aircraft, means automatically forcing said second casing out of securing engagement with said first casing after said casings have fallen freely a predetermined distance so that said second casing may fall free of said first casing releasing the parachute and extending said antenna, cable means secured to the free end of said antenna and said first casing for relieving said antenna of the tensional forces set up therein after said antenna has been extended, and rotatable means for playing out said cable means as the antenna is being extended thereby preventing the formation of twists in said cable means.

GEORGE L. KOHR.
RAYMOND L. FREAS.

REFERENCES CITED

The following references are of record in the file of this patent:

UNITED STATES PATENTS

| Number | Name | Date |
| --- | --- | --- |
| 1,557,389 | Todd | Oct. 13, 1925 |
| 1,780,369 | Snow | Nov. 4, 1930 |
| 2,074,683 | Driggs | Mar. 23, 1937 |
| 2,124,876 | Driggs | July 26, 1938 |
| 2,198,697 | Driggs | Apr. 30, 1940 |
| 2,323,064 | Lustfield | June 29, 1943 |
| 2,361,177 | Chilowsky | Oct. 24, 1944 |